United States Patent
Abu-Isa

(12) 
(10) Patent No.: US 6,395,357 B1
(45) Date of Patent: May 28, 2002

(54) FUEL PERMEATION BARRIER FUEL TANK

(75) Inventor: Ismat Ali Abu-Isa, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 09/654,200

(22) Filed: Sep. 1, 2000

Related U.S. Application Data

(60) Provisional application No. 60/172,563, filed on Dec. 18, 1999.

(51) Int. Cl.$^7$ .......................... B29D 22/00; B32B 1/08; B32B 27/08
(52) U.S. Cl. .................... 428/35.7; 428/36.6; 428/36.7; 428/35.4; 428/505; 428/515; 428/520; 428/516
(58) Field of Search ............................... 428/36.7, 36.6, 428/35.4, 36.9, 36.91, 505, 515, 526

(56) References Cited

U.S. PATENT DOCUMENTS

| | | | |
|---|---|---|---|
| 3,616,044 A | * 10/1971 | Kehr ........................... | 156/320 |
| 4,237,247 A | * 12/1980 | Matoba et al. .............. | 525/335 |
| 4,737,548 A | * 4/1988 | Kojima et al. .............. | 525/193 |
| 6,033,749 A | * 3/2000 | Hata et al. .................. | 428/36.7 |

* cited by examiner

*Primary Examiner*—Harold Pyon
*Assistant Examiner*—Marc Patterson
(74) *Attorney, Agent, or Firm*—Vincent A. Cichosz

(57) ABSTRACT

A fuel permeation barrier fuel tank for a vehicle includes a tank shell having a wall formed from a plurality of layers. The layers include at least an inner layer, an outer layer, a fuel permeation barrier layer disposed between the inner layer and the outer layer, and at least one adhesive layer being made of at least one of a chlorinated polyethylene and chlorosulfonated polyethylene disposed between either the inner layer and the outer layer and the fuel permeation barrier layer.

20 Claims, 1 Drawing Sheet

FUEL PERMEATION BARRIER FUEL TANK

CROSS-REFERENCE TO RELATED APPLICATION(S)

The present invention claims the priority date of copending U.S. Provisional Patent Application Ser. No. 60/172,563, filed Dec. 18, 1999.

TECHNICAL FIELD

The present invention relates generally to fuel tanks for vehicles and, more particularly, to a fuel permeation barrier fuel tank for a vehicle.

BACKGROUND OF THE INVENTION

It is known to provide a fuel tank such as a plastic fuel tank in a vehicle to hold fuel to be used by an engine of the vehicle. When a plastic fuel tank is made, a weld line is formed by the co-extrusion of a multi-layer parison and blow molding it to form the tank, or when sheets are co-extruded, vacuum formed into two shells, and welded together to form the tank. In most cases, one of the co-extruded layers is a material that acts as a barrier to prevent excessive permeation of fuel into the atmosphere. At the weld line, continuity of this layer is not insured. As a result, a plastic fuel tank having a discontinuous permeation barrier layer made of an ethylene vinyl alcohol copolymer (EVOH) is likely to emit more fuel.

One commercial approach to resolve this concern regarding permeation is to thicken the walls of the fuel tank, which increases the weight, cost and reduces fuel capacity of the fuel tank. Another commercial approach is to protect the fuel tank by metal sheets or shields, which increases the weight and cost of the plastic fuel tank. However, there is concern that the thinner wall thickness may prevent the fuel tank from passing a flammability test.

Therefore, it is desirable to provide a fuel tank for a vehicle that has a more effective fuel permeation barrier to prevent evaporative emission. It is also desirable to provide a simplified method to seal a weld line in a plastic fuel tank for a vehicle that significantly reduces evaporative emission and cost of the fuel tank.

SUMMARY OF THE INVENTION

It is, therefore, one object of the present invention to provide a new fuel permeation barrier fuel tank for a vehicle.

It is another object of the present invention to seal a weld line in a plastic fuel tank that significantly reduces evaporative emission and cost.

To achieve the foregoing objects, the present invention is a fuel permeation barrier fuel tank for a vehicle including a tank shell having a wall formed from a plurality of layers. The layers include at least an inner layer, an outer layer, a fuel permeation barrier layer between the inner layer and the outer layer, and at least one adhesive layer being made of at least one of a chlorinated polyethylene and chlorosulfonated polyethylene disposed between either the inner layer and outer layer and the fuel permeation layer.

One advantage of the present invention is that a fuel permeation barrier fuel tank is provided for a vehicle that has a more effective fuel permeation barrier leading to less evaporative emission. Another advantage of the present invention is that the fuel permeation barrier fuel tank uses an adhesive layer between the high density polyethylene tank wall and the permeation barrier layer to effect bonding. Yet another advantage of the present invention is that the fuel permeation barrier fuel tank seals the weld line in a plastic fuel tank by deposition of a layer of the permeation barrier to cover the weld. Still another advantage of the present invention is to incorporate another layer of the adhesive layer on the outside of the barrier layer to protect against scratching or other environmental aging agents. A further advantage of the present invention is that the adhesive layer is made of chlorinated polyethylene and chlorosulfonated polyethylene, thereby lower cost of the fuel tank.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
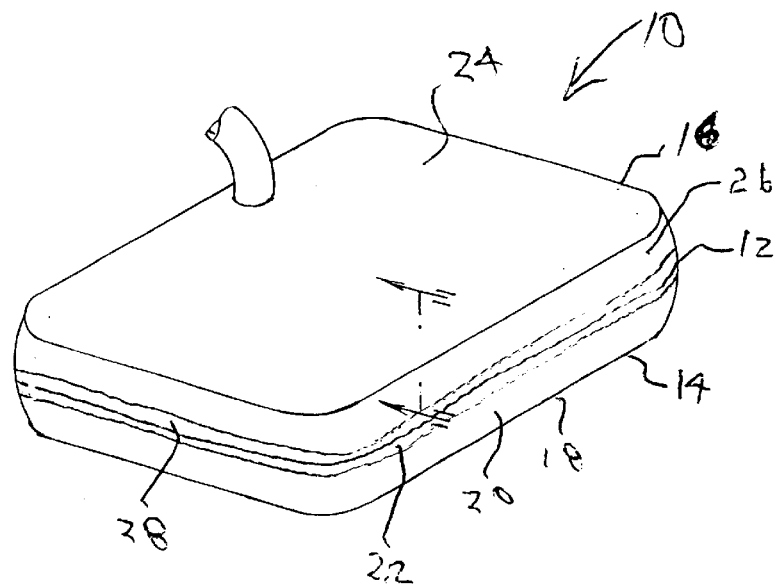
FIG. 1 is a perspective view of a fuel permeation barrier fuel tank, according to the present invention.
Figure 2:
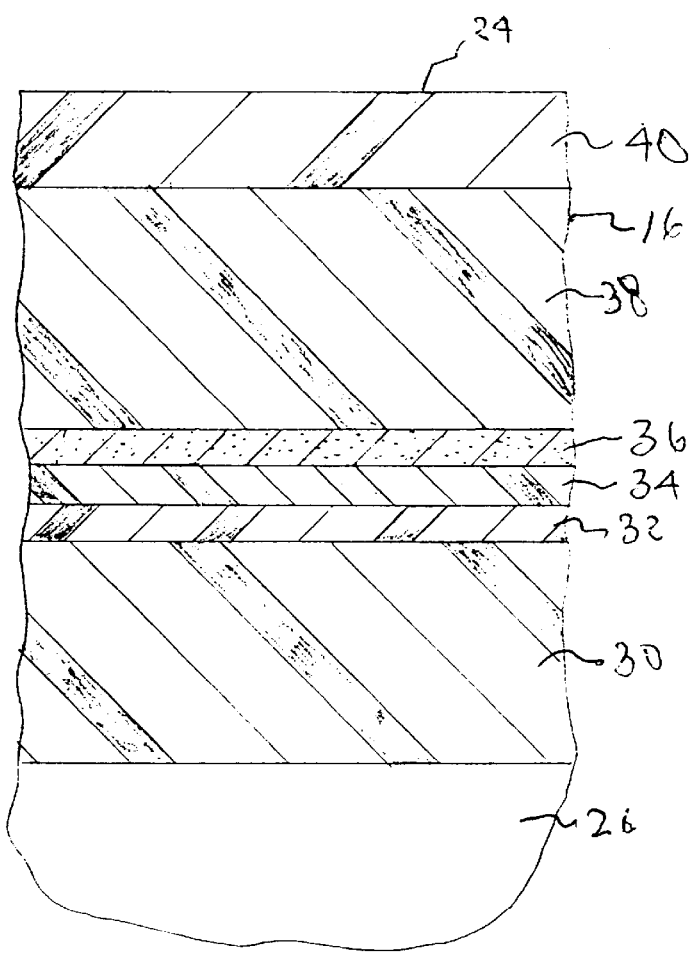
FIG. 2 is a sectional view taken along line 2—2 of FIG. 1.

Referring to the drawings and in particular FIGS. 1 and 2, one embodiment of a fuel permeation barrier fuel tank 10, according to the present invention, is shown for a vehicle (not shown). The fuel permeation barrier fuel tank 10 includes a tank shell 12. In the embodiment illustrated, the tank shell 12 is of a generally rectangular type. The tank shell 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together to form a seam by suitable means such as by thermoforming, compression molding, or friction welding. The lower half shell 14 and upper half shell 16 are made of a rigid material such as a thermoformable plastic.

Referring to FIGS. 1 and 2, the fuel permeation barrier fuel tank 10 has the base walls 18,24, side walls 20,26, and flanges 22,28 formed from a plurality of layers 30,32,34, 36,38,40. The first layer 30 is an inner layer made from a high-density polyethylene (HDPE), which is a conventional material known in the art. The first layer 30 has a predetermined thickness of approximately two millimeters (2.00 mm). The first layer 30 also has a predetermined percentage of the material weight such as approximately 40%.

The second layer 32 is an adhesive layer made from an adhesive such as chlorinated polyethylene (CPE) or chlorosulfonated polyethylene known as Hypalon, which are conventional materials known in the art. CPE may contain about one weight percent 1 wt.% to about 5 wt.% peroxide curative such as dicumyl peroxide (Dicup) and about 1 wt.% to about 5 wt.% curing co-agent such as trimethylopropane trimethacrylate (TMPT) for excellent adhesion to HDPE and good adhesion to ethylene vinyl alcohol (EVOH). Hypalon may contain about one weight percent 1 wt.% to about 5 wt.% peroxide curative such as Dicup and about 1 wt.% to about 5 wt.% curing co-agent such as TMPT for excellent adhesion to EVOH and very good adhesion to EVOH. Also, a composite or blend of CPE and Hypalon with or without the Dicup and the TMPT develop excellent adhesion to both HDPE and EVOH. Many grades of CPE and several grades of chlorosulfonated polyethylene are commercially available. The second layer 32 has a predetermined thickness of approximately 0.07 mm. The second layer 32 also has a predetermined percentage of the material weight such as approximately 2.5%. It should be appreciated that the adhesives bind the HDPE to EVOH. It should also be appreciated that these adhesives are soluble and can be applied with a spray gun (not shown).

The third layer 34 is a barrier layer made from an ethylene vinyl alcohol (EVOH) copolymer, which is a conventional material known in the art. The third layer 34 has a predetermined thickness of approximately 0.11 mm. The third layer 36 also has a predetermined percentage of the material weight such as approximately 3.0%. It should be appreciated that the barrier layer may be made from polyethylene terephthalate (Mylar), tetrafluoroethylene-hexafluoropropylene-vinylidene fluoride terpolymer (TVH), or liquid crystalline polymers such as Vectra, which is commercially available from Hoechst Celanese.

The fourth layer 36 is an adhesive layer made from an adhesive such as chlorinated polyethylene (CPE) or Hypalon previously described for the second layer 32. The fourth layer 36 has a predetermined thickness of approximately 0.07 mm. The fourth layer 36 also has a predetermined percentage of the material weight such as approximately 2.5%.

The fifth layer 38 is a regrind layer made from a one hundred percent (100%) regrind of a high-density polyethylene (HDPE), which is a conventional material known in the art. The fifth layer 38 has a predetermined thickness of approximately 1.5 mm. The fifth layer 38 also has a predetermined percentage of the material weight such as approximately 40%.

The sixth layer 40 is an outer layer made from a high-density polyethylene (HDPE), which is a conventional material known in the art. The sixth layer 40 has a predetermined thickness of approximately one millimeter (1.00 mm). The sixth layer 46 also has a predetermined percentage of the material weight such as approximately 12%. It should be appreciated that the layers 30,32,34,36,38,40 have a total thickness of approximately 4.75 mm.

In manufacturing the fuel permeation barrier fuel tank 10, several processes may be used. Preferably, the second layer 32 and fourth layer 36 are applied from a solution by a spray gun (not shown), in a similar process as applying paint. Because the EVOH for the barrier layer 34 currently used for making fuel tanks is soluble in many common solvents including alcohols, a formulation of EVOH that is a sprayable solution is sprayed over the second layer 32, followed by spraying the fourth layer 36. The CPE is an adhesion promoter and exhibits excellent adhesion to the HDPE and good adhesion to the EVOH. It should be appreciated that CPE is soluble in aromatic and chlorinated solvents and hence a sprayable solution of polymer can be made. It should also be appreciated that the adhesive-EVOH-adhesive is applied to the weld line of the fuel permeation barrier fuel tank 10 to ensure a continuous layer of the EVOH permeation barrier, leading to low permeation plastic fuel tank. It should further be appreciated that the use of CPE/Hypalon adhesives will allow sealing of the seam (bond line) in the fuel tank 10 by simply spraying of the adhesive layer on the HDPE present at the seam surface, followed by a layer of EVOH, again sprayed in place, followed by another adhesive layer to protect the EVOH layer against aging or abrasion.

In another embodiment, the fuel permeation barrier fuel tank 10 may be formed by forming separate sheet 30,34,38, 40 bonded together by heating during vacuum forming, then a thin layer of adhesive for the second layer 32 and fourth layer 36 can be uniformly sprayed on top and bottom of the EVOH layer to effect adhesion with the HDPE layers. On the other hand, if the layers 30,34,38,40 are formed and bonded during co-extrusion, the adhesive layers 32,36 can be extruded in layers one on top and one on the bottom of the EVOH layer and thermoformed by heat and pressure.

In yet another embodiment, the fuel permeation barrier fuel tank 10 may be formed by depositing both the EVOH and the adhesive layers from the melt in a process similar to that used for the application of hot melt adhesives. Again, excellent adhesion occurs between HDPE and the CPE and good adhesion with EVOH when the CPE is applied as a hot melt adhesive. The CPE may be co-extruded with the other layers in the form of a sheet for subsequent vacuum forming into a fuel tank, or in the form of a parison in case of blow molding. It should be appreciated that the wall of the fuel tank 10 is made by either vacuum forming or by blow molding.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel permeation barrier fuel tank for a vehicle comprising:
   a tank shell having a wall formed from a plurality of layers;
   said layers comprising at least an inner layer, an outer layer, a fuel permeation barrier layer disposed between said inner layer and said outer layer, and at least one adhesive layer being made of at least one of a chlorinated polyethylene and chlorosulfonated polyethylene disposed between either said inner layer and said outer layer and said fuel permeation barrier layer.

2. A fuel permeation barrier fuel tank as set forth in claim 1 wherein said fuel permeation barrier layer is made of an ethylene vinyl alcohol (EVOH) material.

3. A fuel permeation barrier fuel tank as set forth in claim 1 wherein said inner layer and said outer layer are made of a polyethylene material.

4. A fuel permeation barrier fuel tank as set forth in claim 1 including a regrind layer disposed between said inner layer and said outer layer and being made of a regrind material.

5. A fuel permeation barrier fuel tank as set forth in claim 4 including a first adhesive layer disposed between said regrind layer and said inner layer.

6. A fuel permeation barrier fuel tank as set forth in claim 5 including a second adhesive layer disposed between said regrind layer and said fuel permeation barrier layer.

7. A fuel permeation barrier fuel tank as set forth in claim 5 wherein said first adhesive layer is disposed between said fuel permeation barrier layer and said inner layer.

8. A fuel permeation barrier fuel tank as set forth in claim 1 wherein said chlorinated polyethylene and chlorosulfonated polyethylene includes about 1 wt.% to about 5 wt.% peroxide curative.

9. A fuel permeation barrier fuel tank as set forth in claim 1 wherein said chlorinated polyethylene and chlorosulfonated polyethylene includes about 1 wt.% to about 5 wt.% curing co-agent.

10. A fuel permeation barrier fuel tank as set forth in claim 1 wherein said chlorinated polyethylene and chlorosulfonated polyethylene includes about about 1 wt.% to about 5 wt.% peroxide curative and 1 wt.% to about 5 wt.% curing co-agent.

11. A fuel permeation barrier fuel tank as set forth in claim 1 wherein said at least one adhesive layer is made of said chlorinated polyethylene and said chlorosulfonated polyethylene.

12. A fuel permeation barrier fuel tank for a vehicle comprising:
   a tank shell having a wall formed from a plurality of layers;
   said layers comprising at least an inner layer, an outer layer, a fuel permeation barrier layer disposed between said inner layer and said outer layer, and at least one adhesive layer disposed between either said inner layer and said outer layer and said fuel permeation barrier layer and being made of at least one of a chlorinated polyethylene and chlorosulfonated polyethylene material including at least one of a peroxide curative and a curing co-agent.

13. A fuel permeation barrier fuel tank as set forth in claim 12 wherein said fuel permeation barrier layer is made of an ethylene vinyl alcohol (EVOH) material.

14. A fuel permeation barrier fuel tank as set forth in claim 12 wherein said inner layer and said outer layer are made of a high-density polyethylene material.

15. A fuel permeation barrier fuel tank as set forth in claim 12 including a regrind layer disposed between said inner layer and said outer layer and being made of a regrind material.

16. A fuel permeation barrier fuel tank as set forth in claim 15 wherein said at least one adhesive layer comprises a first adhesive layer disposed between said fuel permeation barrier layer and said inner layer.

17. A fuel permeation barrier fuel tank as set forth in claim 16 wherein said at least one adhesive layer further comprises a second adhesive layer disposed between said regrind layer and said fuel permeation barrier layer.

18. A fuel permeation barrier fuel tank as set forth in claim 12 wherein said peroxide curative is from bout 1 wt.% to about 5 wt.% and said curing co-agent is from about 1 wt.% to about 5 wt.%.

19. A fuel permeation barrier fuel tank as set forth in claim 12 wherein said at least one adhesive layer is made of said chlorinated polyethylene and said chlorosulfonated polyethylene.

20. A fuel tank for a vehicle comprising:

a tank shell having a wall formed from a plurality of layers;

said layers comprising at least an inner layer, an outer layer comprising a high-density polyethylene material, a fuel permeation barrier layer comprising an ethylene vinyl alcohol material disposed between said outer layer and said inner layer, and at least one adhesive layer disposed between either said inner layer and said fuel permeation barrier layer and being made of at least one of a chlorinated polyethylene and chlorosulfonated polyethylene material.

* * * * *